United States Patent [19]

Long et al.

[11] Patent Number: 4,639,343

[45] Date of Patent: Jan. 27, 1987

[54] FORMING TECHNIQUES FOR SHAPING POLYIMIDE FOAMS

[76] Inventors: John V. Long, 1756 E. Lexington Pl., El Cajon, Calif. 92021; John Gagliani, 6280 Lance Pl., San Diego, Calif. 92120

[21] Appl. No.: 736,241

[22] Filed: May 20, 1985

[51] Int. Cl.$^4$ ............ C08J 9/34; C08J 9/02; B29C 43/00; B29C 67/22

[52] U.S. Cl. .................... 264/45.5; 264/54; 264/158; 264/321; 264/DIG. 14; 425/395; 425/408; 425/817 R

[58] Field of Search ............ 264/321, 45.5, DIG. 14, 264/158, 54; 425/817 R, 408, 395

[56] References Cited

U.S. PATENT DOCUMENTS

| | | | |
|---|---|---|---|
| 3,484,510 | 12/1969 | Corazza | 264/51 |
| 3,518,334 | 6/1970 | Carrigan et al. | 264/321 X |
| 3,534,128 | 10/1970 | Makowski | 264/321 X |
| 3,534,134 | 10/1970 | Mathews | 264/321 |
| 3,553,068 | 1/1971 | Coale | 264/321 X |
| 3,554,939 | 1/1971 | Lavin et al. | |
| 4,265,851 | 5/1981 | Roth | 264/321 |
| 4,315,076 | 2/1982 | Gagliani et al. | 521/77 |
| 4,361,453 | 11/1982 | Gagliani et al. | 521/122 X |
| 4,394,464 | 7/1983 | Gagliani et al. | 521/180 |
| 4,407,980 | 10/1983 | Gagliani et al. | 521/99 |
| 4,476,254 | 10/1984 | Long et al. | 521/180 |

*Primary Examiner*—Philip Anderson
*Attorney, Agent, or Firm*—Frank D. Gilliam

[57] ABSTRACT

A method of re-shaping polyimide and modified polyimide foam sheets into selected shapes. Polyimide foam sheets can be made by any of a number of methods, some of which produce sheets of selected thicknesses directly and others of which produce blocks or buns of foam which are sliced into sheets. A sheet is placed in a mold having the desired configuration, such as a half-pipe. The sheet is compressed to about 0 to 99% of the original thickness with heating of one or both major surfaces of the sheet to a temperature of from about 250° to 320° C. for about 0.5 to 5 minutes. Upon removal from the mold, the polyimide foam is found to be self-supporting and to have taken on the mold shape. A moisture impervious densified skin is found on the heated side(s).

15 Claims, 3 Drawing Figures

0
FORMING TECHNIQUES FOR SHAPING POLYIMIDE FOAMS

BACKGROUND OF THE INVENTION

This invention relates in general to polyimide foam structures and, more particularly, to methods of reshaping polyimide foam sheets into self-supporting structures of desired shapes.

Polyimide and modified polyimide foams are manufactured by a number of different processes. Typical are those described in our prior U.S. Pat. Nos. 4,407,980 and our co-pending U.S. patent applications Ser. No. 678,992 filed Dec. 6, 1984 and Ser. No. 556,604, filed Feb. 14, 1985. Also typical are U.S. Pat. No. 4,315,076 filed Apr. 16, 1981, U.S. Pat. No. 4,361,453 filed May 11, 1981 assigned to International Harvester and Monsanto respectively.

In one method, polyimide precursors are prepared by reacting a tetracarboxylic acid dianhydride or its half ester with a diamine, then heating the precursor in a thermal over to cause the material to expand into a foam while forming the polyimide. A large block or bun of foam is produced.

Another method of preparing polyimide foams involves reacting an imidocaproic acid monomer with a diamine. The imidocaproic acid monomer is prepared by reacting a tetracarboxylic acid dianhydride with caprolactam in a ratio of dianhydride to caprolactam of less than about 1:1.5. The resulting polyimide powder is caused to foam by heating it to a temperature in the range of about 150° to 320° C. in a square mold. The resulting foam bun is then cut into slabs or sheets of desired thickness.

In some cases it is possible to directly foam the polyimide to the desired sheet thickness. However, in most cases the resulting sheet has an excessively irregular upper surface, so that it is usually preferred to slice sheets from a larger block to obtain highly uniform sheets of the selected thickness.

Polyimide foam sheets have a large number of applications which take advantage of their flexibility and flame resistance, such as seat cushions in aircraft. Other applications such as insulating air ducts in aircraft, spacecraft, naval ships, etc., which need the flame resistance and lack of toxic gases when exposed to flame for the protection of passengers and personnel require a variety of foam configurations. Wrapping ducts with sheets is often not satisfactory, since the elastic characteristics of the sheets cause them to come loose and they are difficult to bend around sharp corners. Such sheets also are not adaptable to requirements for varying thicknesses, often are moisture permeable and have low surface strength.

Attempts have been made to foam the polyimide in a mold, such as a half-pipe, having a desired final configuration. This has been, unfortunately, found to produce structures of greatly varying density and poor mold filling, especially with molds having relatively thin areas. The structures produced by this method have been found to have local weak areas and to not retain their final shapes well. It is very difficult to obtain a desired density and strength uniformity (or selected density and strength gradients) in structures made by this method.

Thus, there is continuing need for improved methods of re-shaping polyimide foam sheets into desired shapes. Improvements are needed in density and strength uniformity. The shapes should be easily made, using standard foam sheets as the starting material. The ability to produce structures which are strong and retain their molded shape out of the mold is needed. A method which permitted forming foam structures having areas of different thicknesses and selected densities would be particularly useful.

SUMMARY OF THE INVENTION

The above problems and others are overcome by a method of reshaping polyimide foam materials which comprises the steps of providing a sheet of polyimide foam, placing the foam sheet in a mold which, when closed, compresses the foam to a desired extent and heating the mold to a temperature from about 250° to 320° C. for from about 0.5 to 5 minutes and removing the shaped foam structure from the mold.

Any suitable foam sheet, having a selected configuration, may be used in this method. Typical foams include those described in out patents and patent applications listed above. For purposes of this application "polyimide" shall include modified polyimides and polyimide-amides as described, for example, in those patents and patent applications.

BRIEF DESCRIPTION OF THE DRAWING

Details of the invention, and of a preferred embodiment thereof, will be further understood upon reference to the drawing, wherein.

DETAILED DESCRIPTION OF THE INVENTION

Figure 1:
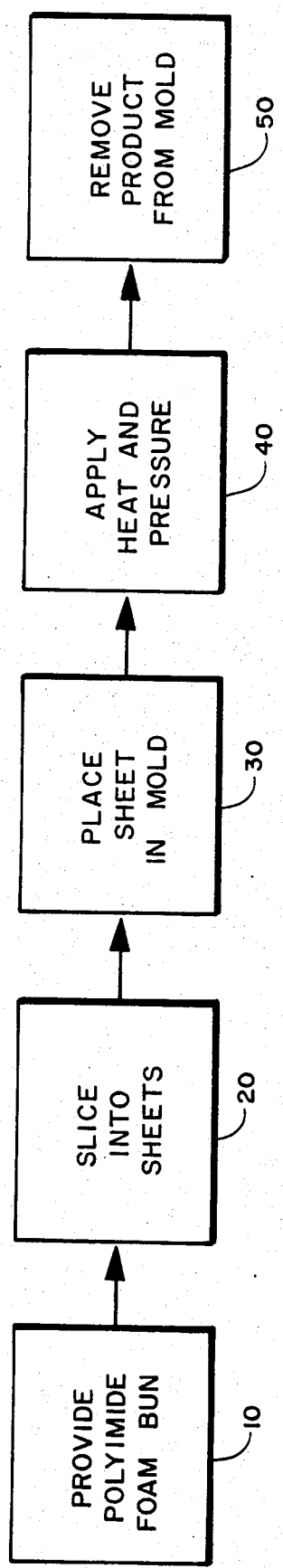
FIG. 1 is a sequential block diagram illustrating the steps in our method.

Referring now to FIG. 1, there is seen a block diagram showing a typical sequence of steps for the method of our invention. The first step, block 10, is providing a block or bun of polyimide foam. Any suitable polyimide foams, made by any suitable method, may be used. The polyimide foam produced by the methods described in our prior patents and patent applications, as listed above, produce foams having outstanding combinations of flexibility, resistance to flame and high temperatures and do not produce significant toxic gasses when exposed to flame.

The second step, block 20, is slicing the foam bun into uniform slices or sheets of desired thickness. Any conventional slicing method may be used. If desired, the form can be originally foamed into sheets or "thin buns" of the desired thickness. However, because these directly formed sheets tend to be irregular in thickness, have surface skins and somewhat irregular densities near their outer surfaces, slicing from larger blocks or buns is generally preferred.

Next, the foam sheet is placed in a mold, block 30, having the desired final configuration. Any suitable molding apparatus may be used. Typical molds are those in which the foam sheet is placed on the platen or in a female mold half, then another platen or a male mold half is moved into position with the foam sheet somewhat compressed therebetween.

After the mold is closed and/or pressure is applied to compress the foam sheet to the desired extent, heat is applied to cure the foam and set the foam in the desired shape. The foam may be compressed to any desired extent, over the broad range of from about 0 to 99% of original thickness. The foam may be uniformly compressed, or different areas within the molded structure can be compressed to different degrees, as desired. In general, greater compression will result in a stiffer, stronger product while less compression will result in a softer, more flexible foam product. If desired, the foam pre-form sheet may have areas of different thickness, so that the final product characteristics can be varied with different degrees of compression in those areas. Also, the spacing between the mold halves may vary, to produce products having thicker or thinner areas. Any suitable mold release agent or mold surfaces may be used to assure separation of the product from the mold.

The foam may be heated, block 40, to any temperature suitable for producing the desired degree of curing for the specific foam being used. With most polyimide foam sheet materials, we have found the best results are obtained when the foam is heated to a temperature of from about 220° to 320° C. for from about 0.5 to 5 minutes. The optimum temperature will vary with the specific polyimide foam used, sometimes being as low as 170° C. and other times as high as 320° C. although generally the 220°–320° C. range gives best results.

The mold may be heated in any suitable manner. Typical heating methods include conduction through one or more of the mold walls to one or more of the major foam surfaces, microwave heating, induction heating or any combination thereof. In many cases, conduction heating through one or both major foam sheet surfaces is preferred, because the surface of the foam in contact with the heated mold wall will form a tough, moisture impervious skin which is desirable for may product applications. Heating only one surface will form a skin on only that side, with the opposite foam surface remaining essentially cellular.

Once heating is complete, the mold is cooled to a suitable temperature, if necessary or desirable, and the product is removed, block 50. The product is a tough, flexible foam structure which retains the molded shape during handling.

Figure 3:
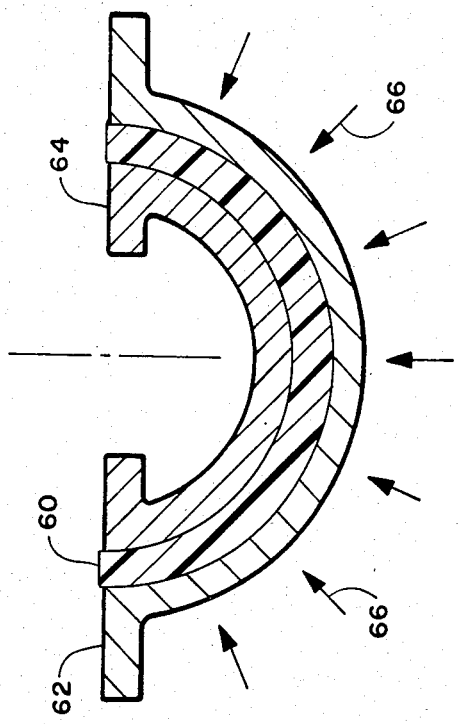
FIG. 3 is a schematic sectional view showing the assembled mold during the curing or re-shaping step.
Figure 2:
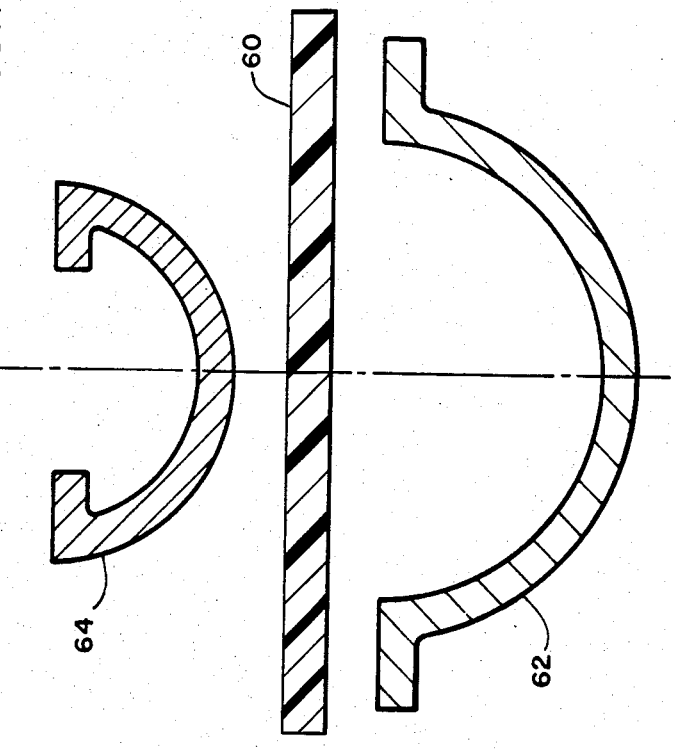
FIG. 2 is a schematic sectional view illustrating assembly of a foam sheet into a half-round mold.

The molding of a typical shape from a polyimide foam sheet is schematically illustrated in FIGS. 2 and 3, which illustrate the shaping of a half-pipe structure which might be used, for example, in insulating a round pipe or duct. As seen in section in FIG. 1, a foam sheet 60 is placed adjacent to the opening in female mold member 62. The sheet 60 is pressed into mold 62 by male mold member 64, until the position shown in FIG. 3 is reached. As can be seen, when the mold is fully assembled, sheet 60 is slightly uniformly compressed between mold members 62 and 64. Since polyimide foam sheet 60 is flexible and elastic, if fits the mold without wrinkling or folding. Once the mold is assembled, heat is applied to cure or set the foam in the molded shape. In this case, radiant heat is applied to the external surface of member 62, as illustrated by arrows 66. Since the heat is applied to only the one surface of sheet 60, a skin will form on that surface. Once the foam has been heated to the desired temperature for the appropriate period, the male mold member 64 is retracted and the reshaped foam 60 is removed and found to have been permanently reshaped into a self-supporting half-pipe with a smooth, moisture impervious skin on the outer surface.

Additives to improve various characteristics of the final foam shape may be added to the foamable material before the foam bun is manufactured. Any appropriate additive may be used, such as reinforcing agents, fillers, surfactants to improve foam uniformity, ultraviolet absorbers, colorants or the like. Typical surfactants include Zonyl FSC from duPont, BRIJ 78, a polyoxyethylene ether from ICI America, Dow Corning 190 silicone surfactant and L550 from Union Carbide. Typical fillers and reinforcements include Kevlar aramide fibers, graphite fibers, glass fibers, Teflon/flurocarbon powders, and mixtures thereof.

Further details of the invention will be understood upon reference to the following examples, which describe preferred embodiments of the method of this invention. All parts and percentages are by weight unless otherwise indicated.

EXAMPLE I

A foam bun having a substantially square cross-section is prepared by the method described in Example I of our copending U.S. patent application Ser. No. 678,992 filed Dec. 6, 1984. A sheet having a thickness of about 2.54 cm. is sliced from the bun by using a horizontal band knife. The foam has a density of about 0.6 lb/ft$^3$. The polyimide foam sheet is placed in a press with one flat platen preheated to about 60° C. and the other to about 315° C. Four spacers, each about 1.27 cm. thick are placed at the corners of the first platen. The platens are moved together until the platens contact the spacers, at a pressure of about 10 psig. After about 1 minute the platens are separated and the foam sheet is removed. The sheet is found to have taken a permanent set, to have a density of about 1.4 lb/ft$^3$ and to possess a densified skin having a thickness of about 1.5 mm. on the hotter platen side. While still flexible, the sheet retains the molded shape when lifted by one edge.

EXAMPLE II

The procedure of Example I is repeated, except that both platens are heated to about 315° C. The molded product has a density of about 1.6 lb/ft$^3$ and possesses densified skins on both sides.

EXAMPLE III

The procedure of Example I is repeated, with the hotter mold side being at the following temperatures: III(a) 200° C., III(b) 250° C., III(c) 350° C., III(d) 400° C., and III(e) 500° C. The reshaped foam sheets produced in these examples have the following characteristics: III(a) low density, flexible, densified skin, III(b) low density, semi-rigid skin, III(c) high density, rigid skin, III(d) high density, very hard skin.

EXAMPLE IV

The procedures of Example I are repeated, with a halfpipe mold of the sort shown in the drawing being used in place of the flat platens. The mold is heated with the lower (female) half heated to 250° C. and the upper (male) half of the mold is heated to 150° C. The press is closed, with the foam sheet compressed to about 75% of its original thickness. The part is removed after about 3 minutes at the above conditions. The foam is found to have taken a permanent set and to have the shape of a half-pipe section. The outer skin of the sheet is densified and the inner surface is still cellular.

EXAMPLE V

The procedures of Example IV are repeated with the only change being the degree of compression of the foam sheet in the mold. The degree of compression is as follows: (as a percentage of the original sheet thickness) V(a) essentially no compression, 100%, V(b) 90%, V(c) 70%, V(d) 50% and V(e) 30%. The foam half-pipes produced have the same characteristics of the foam of example IV, except that the density increases as the compression rate is increased.

EXAMPLE VI

The procedures of Example IV are repeated, except that the original sheet used has areas which are about 40% thicker than the balance of the sheet. When compressed in the mold the half-pipe has a uniform thickness. The areas which were originally thicker have higher density and strength.

EXAMPLE VII

The procedures of Example IV are repeated, except that the inner surface of the female mold has several small raised areas which decrease the thickness of the original foam sheet by an additional 20%. The final foam half-pipe has thin areas corresponding to the raised mold areas. These areas are found to have higher density and stiffness.

EXAMPLE VIII

The procedures of Example I are repeated, except that the foam bun is produced by the following methods: VIII(a) the method of Example I of our copending U.S. patent application Ser. No. 556,604, filed Oct. 4, 1983, VIII(b) the method of Example I of our U.S. Pat. No. 4,407,980, VIII(c) the method of Example I of our U.S. Pat. No. 4,394,464, VIII(d) the method of the second test of Example I of our U.S. Pat. No. 4,476,254, VIII(e) the method of Example IV(a) of our copending U.S. patent application Ser. No. 678,992, filed Dec. 6, 1984, VIII(f) the method of Example II of U.S. Pat. No. 4,315,076, VIII(g) Example I of U.S. Pat. No. 4,361,453 and VIII(h) Example I of U.S. Pat. No. 3,554,939. In each case an excellent product having a densified on the hotter side results.

EXAMPLE IX

The procedures according to Example I are repeated, except that the following additives are mixed with the foamable material prior to drying: IX(a) about 1 wt. % BRIG 78 surfactant, a polyoxyethylene either from ICI America, IX(b) about 5 wt. % chopped graphite fibers, IX(c) about 10 wt. % chopped glass fibers, and IX(d) about 1.5 wt. % Zonyl FSC from E. I. duPont de Nemours & Co. The surfactants appear to produce a more uniform foam, while the fiber reinforcements improve the strength of the final product.

Although specific components, proportions and conditions have been specified in the above examples, which illustrate preferred embodiments of this invention, these may be varied, where suitable, with similar results. For example, various mold configurations may be used, heated in various ways, and other materials may be added to the foam, such as fillers, colorants, ultraviolet absorbers or the like.

Other applications, modifications and ramifications of the present invention will occur to those skilled in the art upon reading the present disclosure. These are intended to be included within the scope of the invention, as defined in the appended claims.

We claim:

1. The method of reshaping polyimide foam sheets which comprises the steps of:

providing a sheet of polyimide foam;

placing one major surface of said sheet into contact with a first mold surface;

bringing a second mold surface at least into substantially complete contact with the second major surface of said sheet and compressing and reshaping the sheet;

heating at least one major surface of said sheet to a temperature of from about 220° to 320° C. for about 0.5 to 5 minutes while allowing the balance of said sheet to remain at a lower temperature; and removing the reshaped foam sheet from the mold;

whereby a self-sustaining foam structure having a higher density, moisture impervious, fire blocking and abrasion resistant skin on the heated foam surface results.

2. The method according to claim 1 wherein both major surfaces of said foam sheet are heated to a temperature of from about 220° to 320° C. and a higher density skin is formed on both major foam surfaces.

3. The method according to claim 1 wherein said foam sheets are provided by slicing sheets of uniform desired thickness from a thicker foam bun.

4. The method according to claim 1 wherein said foam sheet has discrete areas of greater thickness and said mold surfaces are spaced a substantially uniform distance apart, whereby the final reshaped foam product has substantially uniform thickness, with regions of higher density corresponding to the thicker original foam sheet areas.

5. The method according to claim 1 wherein said foam sheet has substantially uniform original thickness, and at least one of said mold surfaces has at least one raised area extending toward the other mold surface, whereby the final reshaped foam product has thinner, higher density areas corresponding to said raised areas.

6. In the method of preparing polyimide foam sheets having a desired configuration, which comprises the steps of reacting a tetracarboxylic acid dianhydride with an oxoimine in a solvent, adding a diamine, drying the solution to a powder, heating the powder in a mold to cause the powder to foam and produce a foam bun and slicing said bun into sheets having desired thicknesses, the improvement comprising the further steps of:

placing one major surface of one of said sheets into contact with a first mold surface;

bringing a second mold surface at least into substantially complete contact with a second major surface of said sheet and compressing and reshaping the sheet;

heating at least one major surface of said sheet to a temperature of from about 220° to 320° C. for about 0.5 to 5 minutes; and removing the reshaped foam sheet from the mold;

whereby a self-sustaining foam structure having a higher density, moisture impervious skin on the heated foam surface results.

7. The method according to claim 6 wherein both major surfaces of said foam sheet are heated to a temperature of from about 220° to 320° C. and a higher density skin is formed on both major foam surfaces.

8. The method according to claim 6 wherein said foam sheets are provided by slicing sheets of uniform desired thickness from a thicker foam bun.

9. The method according to claim 6 wherein said foam sheet has discrete areas of greater thickness and said mold surfaces are spaced a substantially uniform distance apart, whereby the final reshaped foam product has substantially uniform thickness, with regions of higher density corresponding to the thicker original foam sheet areas.

10. The method according to claim 6 wherein said foam sheet has substantially uniform original thickness, and at least one of said mold surfaces has at least one raised area extending toward to the other mold surface, whereby the final reshaped foam product has thinner, higher density areas corresponding to said raised areas.

11. In the method of preparing polyimide foam sheets having a desired configuration, which comprises the steps of reacting a tetracarboxylic acid dianhydride with a caprolactam in a mole ratio less than 1:1.5 in a solvent to produce an imidocaproic acid monomer, reacting said monomer with a diamine in a substantially stoichiometric ratio, drying the solution to a powder, heating said powder in a mold to cause it to foam and form a polyimide foam bun, removing said bun from said mold and slice it into foam sheets of desired thicknesses, the improvement comprising the further steps of:

placing one major surface of one of said sheets into contact with a first mold surface;

bringing a second mold surface at least into substantially complete contact with a second major surface of said sheet and compressing and reshaping the sheet;

heating at least one major surface of said sheet to a temperature of from about 220° to 320° C. for about 0.5 to 5 minutes; and removing the reshaped foam sheet from the mold;

whereby a self-sustaining foam structure having a higher density, moisture impervious skin on the heated foam surface results.

12. The method according to claim 11 herein both major surfaces of said foam sheet are heated to a temperature of from about 220° to 320° C. and a higher density skin is formed on both major foam surfaces.

13. The method according to claim 11 wherein said foam sheets are provided by slicing sheets of uniform desired thickness from a thicker foam bun.

14. The method according to claim 11 wherein said foam sheet has discrete areas of greater thickness and said mold surfaces are spaced a substantially uniform distance apart, whereby the final reshaped foam product has substantially uniform thickness, with regions of higher density corresponding to the thicker original foam sheet areas.

15. The method according to claim 11 wherein said foam sheet has substantially uniform original thickness, and at least one of said mold surfaces has at least one raised area extending toward to the other mold surface, whereby the final reshaped foam product has thinner, higher density areas corresponding to said raised areas.

* * * * *